United States Patent
Zhang et al.

(10) Patent No.: US 12,446,826 B2
(45) Date of Patent: Oct. 21, 2025

(54) GARMENT FOR MULTI-CHANNEL ECG MONITORING

(71) Applicant: Hong Kong Centre for Cerebro-cardiovascular Health Engineering Limited, Hong Kong (HK)

(72) Inventors: Yuan-Ting Zhang, Hong Kong (HK); Xinge Yu, Hong Kong (HK); Yiming Liu, Hong Kong (HK); Jingkun Zhou, Hong Kong (HK); Sina Khazaee Nejad, Hong Kong (HK)

(73) Assignee: Hong Kong Centre for Cerebro-cardiovascular Health Engineering Limited, Hong Kong (HK)

( * ) Notice: Subject to any disclaimer, the term of this patent is extended or adjusted under 35 U.S.C. 154(b) by 684 days.

(21) Appl. No.: 17/550,872

(22) Filed: Dec. 14, 2021

(65) Prior Publication Data
US 2023/0172543 A1    Jun. 8, 2023

Related U.S. Application Data

(63) Continuation-in-part of application No. 17/457,537, filed on Dec. 3, 2021, now abandoned.

(51) Int. Cl.
*A61B 5/00* (2006.01)
*A61B 5/282* (2021.01)

(52) U.S. Cl.
CPC .......... *A61B 5/6804* (2013.01); *A61B 5/0006* (2013.01); *A61B 5/002* (2013.01); *A61B 5/282* (2021.01)

(58) Field of Classification Search
CPC ......... A61B 5/0006; A61B 5/002; A61B 5/28; A61B 5/282; A61B 5/6802; A61B 5/6804
See application file for complete search history.

(56) References Cited

U.S. PATENT DOCUMENTS

2005/0059896 A1*  3/2005  Drakulic ............... A61B 5/308
                                                600/509
2008/0287769 A1*  11/2008  Kurzweil .............. A61B 5/25
                                                600/509

(Continued)

FOREIGN PATENT DOCUMENTS

WO    2010099729 A1    9/2010
WO    2015056262 A1    4/2015

OTHER PUBLICATIONS

Texas Instruments, "ADS129x Low-Power, 8-Channel, 24-Bit Analog Front-End for Biopotential Measurements," SBAS459K—Jan. 2010—Revised Aug. 2015, pp. 1-112, Copyright 2010-2015, Texas Instruments Incorporated (Year: 2015).*

*Primary Examiner* — Linda C Dvorak
*Assistant Examiner* — Bradford C. Blaise
(74) *Attorney, Agent, or Firm* — Endurance Law Group PLC; James R. Yee

(57) ABSTRACT

A garment to be worn directly on the upper body of a person is formed from fabric and includes a flexible printed circuit board and a number of mounting points for electrocardiogram (ECG) electrodes to which ECG electrodes can be releasably attached. For each mounting point, a wire is embedded in the fabric. Each of the wires can electrically connect an ECG electrode attached to the respective mounting point to the flexible printed circuit board. The flexible printed circuit board includes processing circuitry configured for evaluating signals received via the wires from ECG electrodes attached to the mounting points to obtain results and further configured for transmitting the results to an external receiver. A system can include a garment and an external receiver in the form of a mobile device.

11 Claims, 2 Drawing Sheets

(56) References Cited

U.S. PATENT DOCUMENTS

| | | | |
|---|---|---|---|
| 2009/0088652 A1* | 4/2009 | Tremblay | A61B 5/6814 |
| | | | 600/389 |
| 2012/0179020 A1* | 7/2012 | Wekell | A61B 5/4878 |
| | | | 600/384 |
| 2013/0281815 A1 | 10/2013 | Varadan | |
| 2016/0066809 A1 | 3/2016 | Luo et al. | |
| 2017/0118838 A1* | 4/2017 | Williams | H05K 3/361 |
| 2018/0111353 A1* | 4/2018 | Huppert | B32B 27/40 |
| 2018/0279951 A1* | 10/2018 | Asnis | A41D 13/0015 |
| 2018/0333058 A1* | 11/2018 | Coulon | A61B 5/0022 |
| 2018/0368495 A1* | 12/2018 | Simmons | A61B 5/6804 |
| 2019/0282821 A1* | 9/2019 | Masuda | A61B 5/259 |
| 2021/0100460 A1* | 4/2021 | Dagdeviren | G01K 13/20 |
| 2021/0212398 A1* | 7/2021 | Markel | A61B 5/6804 |
| 2021/0219895 A1* | 7/2021 | Currano | A61B 5/313 |

\* cited by examiner

GARMENT FOR MULTI-CHANNEL ECG MONITORING

RELATED APPLICATION

The present application is a continuation-in-part of application Ser. No. 17/457,537, filed Dec. 3, 2021, the entire contents of which are hereby incorporated by reference.

FIELD OF THE INVENTION

The present invention is directed to a garment to be worn directly on an upper body of a person as well a system comprising such garment to be worn directly on an upper body of a person and a mobile device. The garment and the system are provided for electrocardiogram monitoring.

BACKGROUND OF THE INVENTION

Electrocardiogram (ECG) monitoring provides a comprehensive image of the electrical activity of a human heart and is often essential for diagnosing cardiovascular diseases. Conventionally in a hospital environment, stationary 12-lead ECG systems are used and have been established as the preferred analysis tool by cardiologists.

An important part of ECG monitoring is performed outside of the hospital environment during routine every-day life. Here, continuous ECG monitoring may, for example, be used for detecting the frequency and duration of silent ischemic episodes, for example, in patients with coronary artery disease. Also, the effectiveness of the treatment in such patients can be evaluated using continuous ECG monitoring outside of the hospital.

However, many portable ECG devices for use outside of the hospital environment are single-lead ECG devices which have a limited validity or reliability. For example, one concern with such devices is that they may lead to false-positive tests which result in more and unnecessary hospital visits.

SUMMARY OF THE INVENTION

In view of the above it is object of the present invention to provide an improved device for ECG monitoring in a patient.

The problem is solved by a garment according to claim 1 and a system according to claim 11. Preferred embodiments of the invention are described in the dependent claims.

In a first aspect the problem underlying the present invention is solved by a garment to be worn directly on the upper body of a person. The garment is formed from fabric. The garment comprises a plurality of mounting points for electrocardiogram (ECG) electrodes to which ECG electrodes can be releasably attached and a flexible printed circuit board. For each of the mounting points a wire is embedded in the fabric. Each of the wires is configured for electrically connecting an ECG electrode attached to the respective mounting point to the flexible printed circuit board such that an electrical signal sensed by the respective ECG electrode can be transmitted to the flexible printed circuit board via the wire. The flexible printed circuit board comprises processing circuitry configured for evaluating signals received via the wires from ECG electrodes attached to the mounting points to obtain results and configured for transmitting the results to an external receiver.

In other words, the present invention is solved by a garment which a person wears directly on the skin of its upper body. The garment is in a preferred embodiment a bra but may also be a tight-fitting top or a piece of underwear which is directly worn on the skin. The garment is largely formed from fabric which defines the general shape and form of the garment and provides the basic structure of the garment. The garment may be formed from multiple different types of fabric, for example, it may comprise parts which are made from a fabric that can be stretched while other parts may be formed from a fabric that is not intended to be stretched. It is understood that different pieces of fabric may be joined in different ways, for example, using stitches, glue, or welding.

The garment further comprises a plurality of mounting points for ECG electrodes which could also be referred to as connectors for ECG electrodes. To these mounting points ECG electrodes are attached before the garment is worn by the user. The mounting points are provided on a surface of the garment facing towards the skin of the upper body when the garment is worn by a user. The ECG electrodes may, for example, be disposable ECG electrodes or patches which are only used once and disposed afterwards. As such, the ECG electrodes are attached releasably to the garment so that they can be removed when the ECG monitoring on a patient has been completed. After the ECG electrodes on the garment have been replaced it can be reused on another person.

The garment further comprises a flexible printed circuit board (PCB) which can deform with the garment on which it is arranged or to which it has been attached. Since the PCB is flexible and deforms with the fabric from which the garment is made, it can be integrated directly into the fabric without causing discomfort to a user of the garment. This advantageously allows the user to wear the garment during his or her regular day-to-day activities so that a continuous ECG monitoring is comfortably possible.

The printed circuit board includes different types of processing circuitry which provides processing capabilities for processing signals captured or recorded or sensed with ECG electrodes attached to the mounting points. The processing may, for example, include various types of preprocessing of signals received from the ECG electrodes, analog-digital conversion, and storage of the digitalized signals. Additional processing steps may also be performed by the processing circuitry.

Further, the processing circuitry is configured or adapted for transmitting the results obtained by processing the signals received from ECG electrodes to an external receiver. Transmission may, for example, be wireless via protocols such as Bluetooth or IEEE 802.11. In a particularly preferred embodiment, the circuit is configured for transmitting results from the processing using a Bluetooth low energy protocol. In an exemplary embodiment which may be implemented in the alternative or in addition to the preceding embodiments, the processing circuitry may be adapted to transmit results over a wired connection according a wired data transmission protocol such as, for example, a USB protocol or an IEEE 802.3 protocol. In any case results may be transmitted on a continuous basis or may be transmitted in a batch at regular or irregular intervals, for example, when a command to transmit results is received from an external receiver.

The garment further comprises wires embedded into the fabric. Each of the wires is provided for connecting an ECG electrode attached to one of the mounting points to the printed circuit. The wires may, for example, connect a contact element at the mounting point to the printed circuit board where the ECG electrodes are electrically attached to the contact element when it is mounted to the respective mounting points. The number of wires corresponds to the number of mounting points, i.e., each ECG electrode is connected with an individual wire or lead to the printed circuit for transmitting electrical signals captured with the respective ECG electrode to the printed circuit board.

The wires are embedded into the fabric to further improved the comfort of the patient wearing the garment and to prevent the wires from getting tangled while the garment is worn by a user. In particular, the wires are embedded into the fabric so that there is not direct contact between the skin of a user wearing the garment and the wire. Further, the wiring or wires should be flexible to accommodate deformations of the garment which serves to further improve the comfort of a person wearing the garment and also prevents damages to the wires when the generally flexible garment is deformed. Examples of ways in which wires may be embedded into the fabric are described in exemplary preferred embodiments. Further, by embedding the wires into the fabric, the wires cannot get tangled or caught, for example, in additional clothing of a person wearing the garment, objects a person wearing the garment is passing or even parts of the body of the person wearing the garment which could lead to a disruption of the connections provided by the wiring and thus a malfunctioning of the ECG monitoring provided by the garment.

In a preferred embodiment, the number of mounting points is ten. Hence, the garment comprises ten mounting points for attaching ECG electrodes. This allows to perform a standard 12-lead ECG monitoring.

It is further preferred that six of the ten mounting points form chest mounting points which are arranged on the garment such that ECG electrodes attached to the chest mounting points are placed on the chest of a person wearing the garment. The four remaining mounting points of the ten mounting points form limb mounting points arranged on the garment such that ECG electrodes attached to the limb mounting points are arranged in vicinity of a limb of a person wearing the garment. An ECG electrode attached to a limb mounting point is in the vicinity of a limb if no ECG electrode attached to one of the other mounting points is closer to the respective limb than the ECG electrode attached to that limb mounting point.

Thus, the ECG electrodes or patches are placed in accordance with Mason-Likar's placement. The six chest electrodes are placed in the same position on the upper body or torso of the person as the standard 12-lead ECG. Each of the four limb mounting points is placed on the garment such that the respective ECG electrode is placed close to a limb of a person wearing the garment instead of placing the respective ECG electrode directly on the respective limb. For example, one mounting point is provided for placing an ECG electrode closer to the left leg of a person wearing the garment than any other mounting point on the garment, another mounting point is provided for placing an ECG electrode closer to the right arm than any other ECG electrode and so on. Using Mason-Likar's placement thus enables to have a full 12-lead ECG with ECG electrodes mounted to a compact garment such as a bra or top which increases the comfort of the user of the garment and allows to reliably monitor ECG activity over an extended period.

In a preferred embodiment the processing circuitry further comprises at least one of a first number of low-pass filters, wherein each of the wires is connected to one of the low pass filters, one or more analog-digital converters for converting analog signals received from ECG electrodes attached to the mounting points into digital signals such that they can be processed by the processing circuitry, and a plurality of low-noise amplifiers for acquiring a Wilson central terminal voltage.

The additional processing circuitry provides front-end processing for the signals received at the printed circuit board from ECG electrodes. For example, for each mounting point and thus each electrode attached to a mounting point a second-order low-pass filter is provided which may, for example, be implemented using capacitors and resistors. The low-pass filters remove high frequency noise. The analog-digital converters may, for example, be provided as part of an ECG front-end integrated circuit (IC). Such ICs are commercially available, for example, in form of the ADS1298 offered by Texas Instruments Inc. Additionally or alternatively, the processing circuitry can include, for example, three low-noise digital amplifiers which determine a Wilson central terminal voltage. The latter is well known in the art and can be used as an artificial reference for the ECG electrodes attached to the chest mounting points.

In a preferred embodiment, the flexible printed circuit board comprises a substrate formed from a flexible polymer film on which the processing circuitry is arranged. Examples of suitable polymer films are, for example, polyimide films or films made from polydimethylsiloxane or polybutylenadipat-terephthalat. Using a polymer film as a substrate for the printed circuit board allows the printed circuit board to be particularly flexible so that the garment can be comfortably worn by a person for extended periods of time.

It is further preferred that the processing circuitry comprises electronics components soldered to the substrate which are connected by copper tracks. Copper is preferred for the connecting the components on the film substrate as it is particularly flexible and does not easily crack or fail even when the substrate is bend or deformed to a considerable degree.

It is further preferred to encapsulate the substrate and the processing circuitry by an upper encapsulating film and a lower encapsulating film, wherein the encapsulating films are preferably formed from a polymer such as, for example, polyimide, polydimethylsiloxane or polybutylenadipat-terephthalat. The encapsulation layers protect the circuitry on the substrate from the environment and, in particular, dust and liquids. The latter is of particular importance as the garment is worn directly and the skin of a person and the processing circuitry is arranged in close vicinity of the skin of the person where it may be subject, for example, to sweat which could negatively affect the functioning of the processing circuitry. Further, the encapsulating films can be made from a range of different plastic materials which are preferably biocompatible to prevent irritation of the skin of a user wearing the garment even when the encapsulating films should come into contact with the skin over an extended period of time.

It is further preferred if the garment comprises a power source for powering the processing circuitry, wherein the power source is attached to the processing circuitry via a voltage regulator for providing a stable input voltage to the processing circuitry. The power source may be arranged on the printed circuit board but could also be arranged space therefrom and connected to the printed circuit board via additional wiring which is, in an exemplary preferred embodiment also embedded in the garment so that it does not impair the comfort of a person wearing the garment and also prevents that the wires providing power to the processing circuitry get tangled which could destroy the circuitry included in the garment.

In a preferred embodiment, the fabric comprises an inner layer and an outer layer, wherein the mounting points for the ECG electrodes are arranged on the inner layer and wherein the inner layer is arranged at least partially between the outer layer and the skin of a person wearing the garment. Using fabric with a least two layers with the mounting points being attached to the inner layer allows using different materials for the inner and outer layer. For example, an inner layer to which the electrodes will be attached using mounting points can be formed from a non-elastic material which ensures that a predetermined spacing between the mounting points is kept, whereas the outer layer can be made at least partially from an elastic or stretchable material to allow a tight fit of the garment to the upper body of a person wearing the garment.

It is further preferred that the wires are embedded in the fabric in that the wires are arranged between the inner layer and the outer layer. Thereby, the wires do not come in direct contact with the upper body of a person wearing the garment. Also, be embedding or hiding the wires between an inner layer and an outer layer of fabric, excess wire lengths can be used which provide an additional degree of flexibility to the wires and any tangling of the wires is prevented.

Alternatively or additionally, the wires are woven into the fabric.

In a preferred embodiment at least part of the fabric is elastic. The garment is configured such that the elastic part of the fabric is expanded when a person wears the garment on its upper body and a compressive force generated by the expansion of the fabric pushes ECG electrodes attached to the mounting points towards the upper body of the person. By using at least partially elastic fabric for the structure of the garment a tight fight of the garment can be ensured while at the same time facilitating the way in which a user may put the garment on. Further, a tight fit of the garment ensures accurate and consistent position of the electrodes attached to the mounting points on the torso of a person wearing the garment, which is important for a reliable ECG monitoring, in particular, when the ECG monitoring is performed over an extended period of time.

In a second aspect the invention is directed to a system comprising a garment according to any of the preceding embodiments and a mobile device, wherein the mobile device forms an external receiver for receiving the results transmitted by the processing circuitry.

The mobile device may, for example, be a mobile phone, a tablet or laptop PC which has been adapted for receiving and processing results transmitted from the garment using corresponding software. The advantages of the system correspond to the advantages of the respective embodiment of the garment used in the system.

BRIEF DESCRIPTION OF THE DRAWINGS

In the following, an exemplary embodiment of a garment will be described in more detail with reference to the drawings, wherein.

DETAILED DESCRIPTION OF THE PREFERRED EMBODIMENTS

Figure 1A:
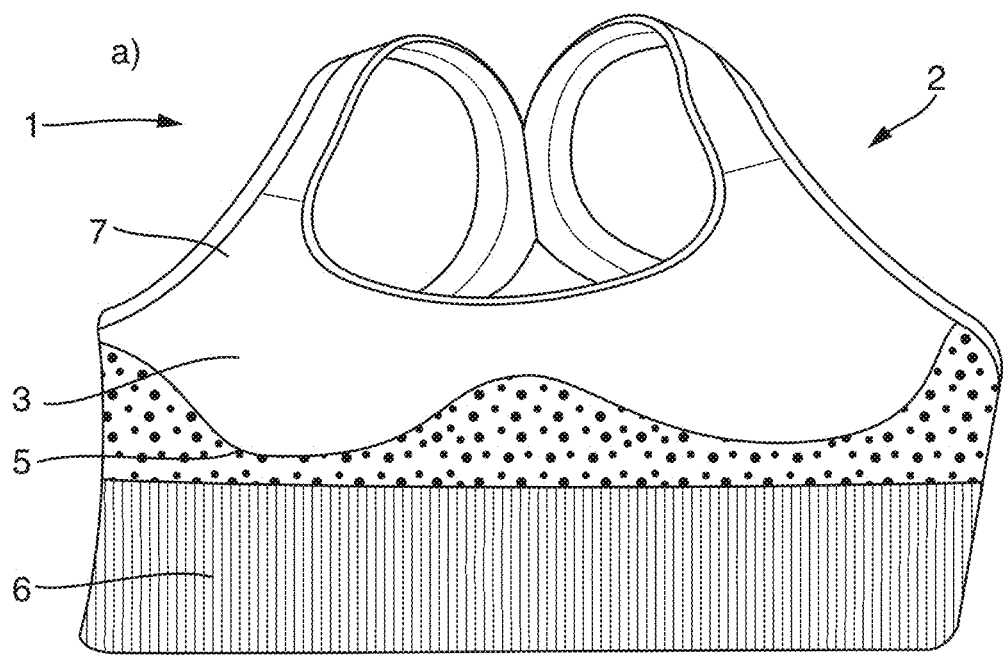
FIG. 1a shows a first view an exemplary embodiment of a garment.
Figure 1B:
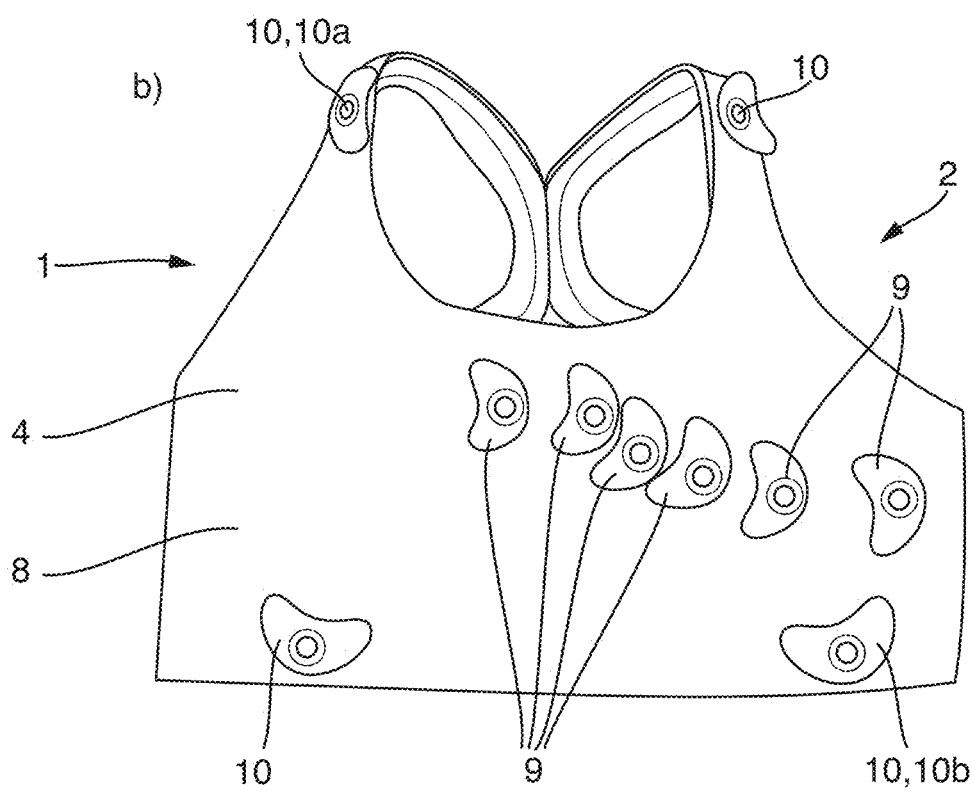
FIG. 1b shows a second view of the exemplary embodiment of a garment according to FIG. 1.

In FIGS. 1a and 1b an exemplary embodiment of a garment 1 in the shape of a sports bra 2 adapted for monitoring the ECG of a person is depicted. The garment 1 is to be worn directly on the upper body of a person and is largely made from fabric 3 comprising an inner layer 4 and an outer layer 5. The inner layer 4 faces towards the skin of a person wearing the garment 1 and is arranged at least partially between the outer layer 5 and the body of the person.

FIG. 1a shows the outer layer 5 of the fabric, whereas the inner layer is show in FIG. 1b. The fabric forming the outer layer 5 is formed partially from elastic fabric 6 and partially from non-elastic fabric 7. The inner layer 4 is formed from a non-elastic fabric 8. Arranged on the inner layer 4 are ten mounting points (not shown) for ECG electrodes to which ECG electrodes 9, 10 have been releasably attached according to Mason-Likar's placement. The ECG electrodes 9, 10 are disposable ECG electrodes which are detached from the mounting points after use of the garment 1 and disposed. Once new ECG electrodes 9, 10 have been attached to the mounting points, the garment 1 can be used for ECG monitoring on another person.

The mounting points to which the ECG electrodes 9 are attached are referred to as chest mounting points as the chest ECG electrodes 9 attached to the chest mounting points will be attached to the chest of a person wearing the garment 1. The limp ECG electrodes 10 are attached to limb mounting points which are arranged in relative terms close to limbs of a person wearing the garment 1. For example, the limb ECG electrode 10a is attached to a mounting point which is located closest among all mounting points to a right arm of a person wearing the garment 1, whereas the limb ECG electrode 10b is attached to a mounting point which is located or arranged closest to a left leg of a person wearing the garment 1.

The exemplary embodiment of a garment 1 shown in FIGS. 1a and 1b further comprises a printed circuit board with circuitry for evaluating electrical signals sensed using the ECG electrodes 9, 10 to obtain results which may be transmitted using the circuitry to an external receiver. In order to transmit or convey the electrical signals from the ECG electrodes 9, 10 to the printed circuit board, wires are embedded in the fabric 3 connecting the ECG electrodes 9, 10 to the printed circuit board. Since the printed circuit board and the wires are arranged between the inner layer 4 of fabric 3 and the outer layer 5 of fabric 3, they are not visible in FIGS. 1a and 1b. Also, no external receiver is shown in FIGS. 1a and 1b.

The garment 1 shown in FIGS. 1a and 1b will now be described in further detail with reference to FIG. 2 which shows a schematic drawing of the structural parts of the garment 1. For the sake of completeness, it is pointed out that the schematic drawing is not drawn to scale and merely show the components of the garment 1 and a system 11 comprising a garment 1 and an external receiver 12. It is not intended to show any relative or absolute positions of the parts of the garment 1.

The external receiver 12 is a mobile phone or tablet which has been configured for receiving and processing data from the garment 1. In other embodiments, the receiver may also be a desktop PC or a laptop.

As previously described, the garment 1 comprises an inner layer 4 and an outer layer 5 of fabric 3 forming the basic structure of the garment 1. The inner layer 4 and the elements arranged on the inner layer 4 are shown in full lines. Arranged on the inner layer 4 and attached thereto are ten mounting points 13, 14 for mounting ECG electrodes 9, 10 to the garment 1. Six mounting points 13 are chest mounting points 13. The chest mounting points 13 are located on the inner layer 4 such that ECG electrodes 9 attached to these mounting points will be arranged on the chest of a user wearing the garment 1. The remaining four mounting points 14 are limb mounting points 14. ECG electrodes 10 attached to these mounting points 14 will be arranged closer to the limbs of a person wearing the garment 1. The particular arrangement of the mounting points 13, 14 according to Mason-Likar's placement is not shown in FIG. 2. The mounting points 13, 14 are merely shown schematically to indicate that they are placed on the inner layer 4.

Between the outer layer 5 of fabric 3 and the inner layer 4 wires 15, a flexible printed circuit board (PCB) 16 and a power source 17 are arranged. Only some of the wires 15 have been marked with reference numerals to keep FIG. 2 intelligible. All parts of the of the garment 1 arranged between the inner layer 4 and the outer layer 5 of fabric 3 are drawn in dashed lines in FIG. 2. The outer layer 5 is drawn in dash-dotted lines.

Figure 2:
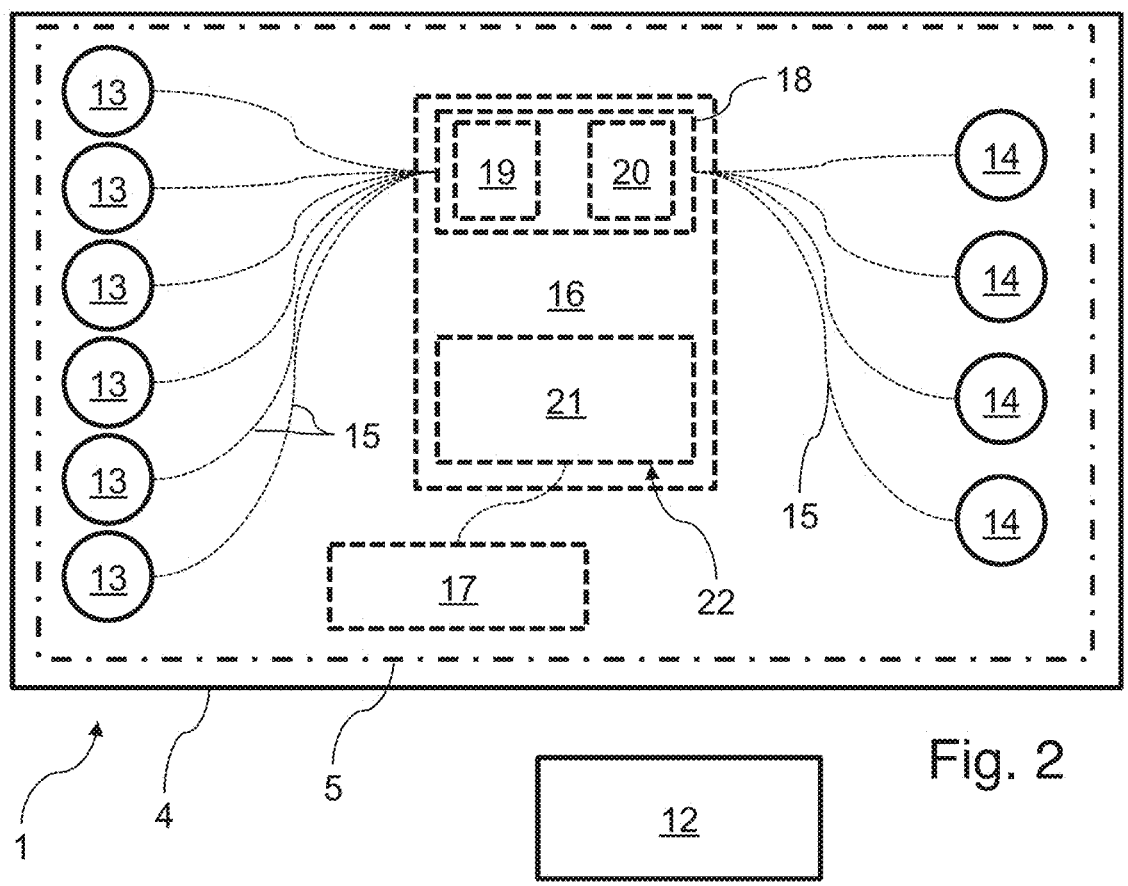
FIG. 2 shows a schematic drawing of the exemplary embodiment of a garment according to FIGS. 1a and 1b.

Each of the wires 15 shown in FIG. 2 extends between one of the mounting points 13, 14 and the PCB 16. The wires 15 are provided for providing an electrical connection between ECG electrodes connected to the mounting points 13, 14 and the PCB 16 so that voltages sensed by the ECG electrodes can be transmitted to the PCB 16. The wires 15 are arranged between the inner layer 4 and the outer layer 5 of the fabric 3 and, thus, embedded therein. In the embodiment shown in FIG. 2, copper wires are used which are very flexible so that they can deform with the garment 1. Further, the wires 15 are knitted to the outer layer 4.

Electrical signals which have been sensed by ECG electrodes 9, 10 attached to the mounting points 13, 14 and transmitted via the wires 15 to the PCB 16 are received at a frontend circuitry 18. The frontend circuitry 18 comprises amongst others ten second-order low-pass filters 19, one for each of the mounting points 13, 14, for filtering high frequency noise. In FIG. 2 only a single element is shown presenting all low-pass filters 19. The frontend circuitry 18 further comprises analog-digital converters for converting the analog signals received at the PCB 16 into digital signals and low-noise amplifiers for acquiring a Wilson central terminal voltage which are all included into the integrated circuit 20.

For further processing of the digital signals a microcontroller unit or processing unit 21 is provided on the PCB 16. The microcontroller unit 21 does not only evaluate or process the digital signals but also provides means for transmitting data or results obtained by evaluating the digital signals to the external receiver 12. In the exemplary embodiment, the results are transmitted according to version 5.1 of the Bluetooth low energy protocol. The degree of processing performed by the microcontroller unit 16 may vary and can be configured depending on the needs. For example, in some embodiments processing is essentially restricted to storing the digitize raw signals which are then transmitted for further processing to the external receiver 12. To this end the PCB 16 includes memory as part of the microcontroller unit 21 for recording data before it is transmitted to the external receiver 12. In other embodiments the processing may include detailed evaluations of the received data so that no raw data has to be stored and only the results of processing are transmitted to the external receiver 12. Memory for storing results or digitized signals is in any case included on the PCB 16 and may or may not be part of the processing unit 21.

The electronics components, e.g., the integrated circuits 20, 21 and low-pass filters 19, including the wiring (not shown) connecting the components may also be jointly referred to as processing circuitry 22. The power supply 17 comprises a rechargeable lithium-ion polymer battery and a linear voltage regulator which securely provides power to the processing circuitry 22 on the PCB 16.

Figures 3, 4:
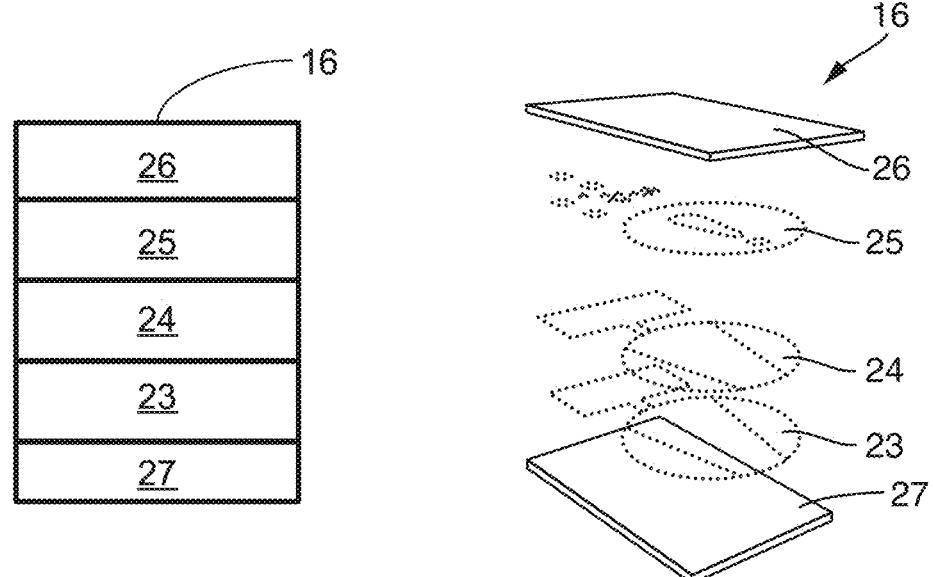
FIG. 3 shows a schematic drawing of an exemplary embodiment of a printed circuit board for an exemplary embodiment of a garment and FIG. 4 shows an exploded view of an exemplary embodiment of the printed circuit board of FIG. 3.

The layout of the flexible PCB 16 is shown more detail in FIGS. 3 and 4. The printed circuit board is shown schematically as a stack of layers in FIG. 3 and in an explosion view in FIG. 4.

The PCB 16 is based on a polymer film substrate 23 in form of a polyimide film on which copper wiring 24 is arranged and to which the electronics components 25 such as the integrated circuits 20, 21 and the resistors and capacitors forming the low-pass filters 19 have been soldered. The copper wiring 24 and the electronics components 25 together from the processing circuitry 22 on the PCB 16. The substrate 23 including the copper wiring or tracks 24 and the electronics components 25 are encapsulated by an upper encapsulation layer 26 and a lower encapsulation layer 27 which are made from a polymer film and, in particular, polybutylenadipat-terephthalat.

The entire PCB 16 is thus very flexible and can easily deform with the fabric 3 of the garment 1 to provide a user of the garment 1 a comfortable experience. The user can thus wear the garment 1 over extended periods of time during which ECG can be monitored reliably. Further, the encapsulation layers 26, 27 are made from a biocompatible material which prevent the components of the PCB 16 from being damaged by environmental influences such as sweat. At the same time due to the biocompatibility of the encapsulation layers 26, 27 the user is protected from any harm by the PCB 16.

In summary, the exemplary embodiment of a garment 1 provides a means of reliable ECG monitoring over extended periods of time outside a hospital environment. Due to the choice of materials and the design of the garment 1 it can be comfortably worn by a user during day-to-day activities for continuous surveillance of the electrical activity of the user's heart. Further, as solely flexible components are used and since all wiring and all processing circuitry is embedded into the garment 1 and, in particular, arranged between the layers 4, 5 of the fabric 3, there is little risk that the electrical components of the ECG monitoring garment 1 are damaged inadvertently. Due to the use of elastic or stretchable fabric 3 in parts it can further be ensured that ECG electrodes 9, 10 attached to the electrode mounting points 13, 14 are safely held in place by the compressive forces of the expanded material.

What is claimed is:

1. A garment to be worn directly on an upper body of a person, wherein the garment is formed from fabric and wherein the garment comprises a plurality of mounting points for electrocardiogram (ECG) electrodes to which ECG electrodes are configured to be releasably attached and a flexible printed circuit board, wherein for each mounting point of the plurality of mounting points a wire is embedded in the fabric, each of the wires being configured for electrically connecting an ECG electrode attached to the respective mounting point to the flexible printed circuit board such that an electrical signal sensed by the respective ECG electrode is transmitted to the flexible printed circuit board via the wire, wherein the flexible printed circuit board comprises processing circuitry configured for evaluating signals received via the wires from the ECG electrodes attached to the plurality of mounting points obtain results and configured for transmitting the results to an external receiver, wherein the flexible printed circuit board comprises a substrate formed from a flexible polymer film on which the processing circuitry is arranged, wherein the flexible polymer film is a polyimide film, wherein the processing circuitry comprises electronics components soldered to the substrate and connected by copper tracks, and wherein the substrate and the processing circuitry are encapsulated by an upper and a lower encapsulating film, wherein the upper and lower encapsulating films are formed from a polymer and the polymer is a polybutylenadipat-terephthalat;

wherein the fabric comprises an inner layer and an outer layer, wherein the plurality of mounting points for the ECG electrodes is arranged on the inner layer, wherein the inner layer is arranged at least partially between the outer layer and skin of the person wearing the garment and wherein the wires are embedded in the fabric in that the wires are arranged between the inner layer and the outer layer and knitted to the fabric, and further wherein the inner layer is formed from a non-elastic material and the outer layer is at least partially formed from elastic material.

2. The garment according to claim 1, wherein the garment is a bra.

3. The garment according to claim 1, wherein the plurality of mounting points comprises ten mounting points.

4. The garment according to claim 3, wherein six of the ten mounting points form chest mounting points which are arranged on the garment such that ECG electrodes attached to the chest mounting points are placed a chest of the person wearing the garment, and wherein four remaining mounting points of the ten mounting points form limb mounting points arranged on the garment such that each of the ECG electrodes attached to the limb mounting points are arranged in vicinity of one of four limbs of the person wearing the garment.

5. The garment according to claim 1, wherein the processing circuitry further comprises at least one of a first number of low-pass filters wherein each of the wires is connected to a respective one of the low pass filters, one or more analog-digital converters for converting analog signals received from the ECG electrodes attached to the plurality of mounting points into digital signals such that the digital signals are processed by the processing circuitry, and a plurality of low-noise amplifiers for acquiring a Wilson central terminal voltage.

6. The garment according to claim 1, wherein the processing circuitry is configured for wirelessly transmitting the results obtained from evaluating signals received via the wires from the ECG electrodes attached to the plurality of mounting points to the external receiver.

7. The garment according to claim 6, wherein the processing circuitry is configured for transmitting the results via a wireless Bluetooth connection.

8. The garment according to claim 1 comprising a power source for powering the processing circuitry, wherein the power source is attached to the processing circuitry via a voltage regulator for providing a stable input voltage to the processing circuitry.

9. The garment according to claim 1, wherein the wires are woven into the fabric.

10. The garment according to claim 1, wherein at least part of the fabric is elastic and wherein the garment is configured such that the elastic part of the fabric is expanded when the person wears the garment on the upper body and a compressive force generated by the expansion of the elastic part of the fabric pushes the ECG electrodes attached to the plurality of mounting points towards the upper body of the person.

11. A system comprising the garment according to claim 1 and a mobile device, wherein the mobile device forms the external receiver for receiving the results transmitted by the processing circuitry.

* * * * *